(12) United States Patent
Toriyabe et al.

(10) Patent No.: US 7,338,085 B2
(45) Date of Patent: Mar. 4, 2008

(54) FUSION-BONDED PROCESSED PRODUCT OF RESIN MEMBER, METHOD FOR PRODUCING SAME AND METHOD FOR FUSION-BONDING RESIN MEMBERS

(76) Inventors: Naoki Toriyabe, 2-25, Ushikubo 2-chome, Tsuzuki-ku, Yokohama-shi, Kanagawa 224-0012 (JP); Tatsuya Kyotani, 8-8-102, Kitayamada 3-chome, Tsuzuki-ku, Yokohama-shi, Kanagawa 224-0021 (JP)

( * ) Notice: Subject to any disclaimer, the term of this patent is extended or adjusted under 35 U.S.C. 154(b) by 0 days.

(21) Appl. No.: 10/889,057

(22) Filed: Jul. 13, 2004

(65) Prior Publication Data

US 2004/0239104 A1 Dec. 2, 2004

Related U.S. Application Data

(63) Continuation of application No. PCT/JP03/00335, filed on Jan. 17, 2003.

(30) Foreign Application Priority Data

Jan. 17, 2002 (JP) .............................. 2002-008506

(51) Int. Cl.
*F16L 13/02* (2006.01)
(52) U.S. Cl. .................. 285/21.2; 285/285.1; 219/535; 156/273.9
(58) Field of Classification Search ............... 285/21.1, 285/21.2, 285.1; 219/535; 156/273.9
See application file for complete search history.

(56) References Cited

U.S. PATENT DOCUMENTS

| | | | | |
|---|---|---|---|---|
| 2,739,829 A | * | 3/1956 | Cundiff et al. | 285/21.2 |
| 2,961,363 A | * | 11/1960 | Lowes | 156/294 |
| 3,061,503 A | * | 10/1962 | Gould et al. | 156/274.2 |
| 3,907,625 A | * | 9/1975 | Vogelsanger | 156/253 |
| 4,365,144 A | * | 12/1982 | Reich et al. | 219/535 |
| 4,436,987 A | * | 3/1984 | Thalmann et al. | 219/535 |
| 4,536,644 A | * | 8/1985 | Thalmann | 219/535 |
| 5,156,420 A | * | 10/1992 | Bokor et al. | 285/21.2 |
| 5,407,520 A | * | 4/1995 | Butts et al. | 156/379.7 |
| 5,410,131 A | | 4/1995 | Brunet et al. | |
| 5,462,314 A | * | 10/1995 | Goto et al. | 285/21.2 |

(Continued)

FOREIGN PATENT DOCUMENTS

CH 0504642 * 4/1971 .................. 285/21

(Continued)

*Primary Examiner*—Aaron Dunwoody
(74) *Attorney, Agent, or Firm*—Westerman, Hattori, Daniels & Adrian, LLP.

(57) ABSTRACT

When resin members (3, 4) are fusion-bonded to each other by electric-conduction heating, a net-form or pattern-form metal wire (2) as a resistance heating element is disposed at a joint portion of the resin members (3, 4), and a metal wire (2) is heated by electric conduction for fusion-bonding the abutting resin members (3, 4) at temperatures sufficient for fusion-bonding with the resin members kept abutting against each other. A production method for a resin-processed product that can increase the strength of the joint portions between resin members, is free from carbon generation and short-circuiting during the electric conduction of a built-in resistance heating element (heating element), and is simple to produce while hardly being affected by environmental temperatures.

10 Claims, 9 Drawing Sheets

U.S. PATENT DOCUMENTS

| | | | | |
|---|---|---|---|---|
| 5,478,118 A | * | 12/1995 | Barq et al. | 285/21.2 |
| 5,836,621 A | * | 11/1998 | Campbell | 285/21.2 |
| 6,131,954 A | * | 10/2000 | Campbell | 285/21.1 |
| 6,394,501 B1 | * | 5/2002 | Bryant, III | 285/21.1 |

FOREIGN PATENT DOCUMENTS

| | | | | |
|---|---|---|---|---|
| DE | 3629166 | * | 3/1988 | 285/21 |
| EP | 000565397 | * | 10/1993 | 285/21 |
| FR | 1416207 | * | 9/1965 | 285/21 |
| JP | 34-15293 | | 9/1959 | |
| JP | 57-33480 | | 7/1982 | |
| JP | 4-83992 | | 3/1992 | |
| JP | 405263983 | * | 10/1993 | 285/21 |

* cited by examiner

F I G. 6a
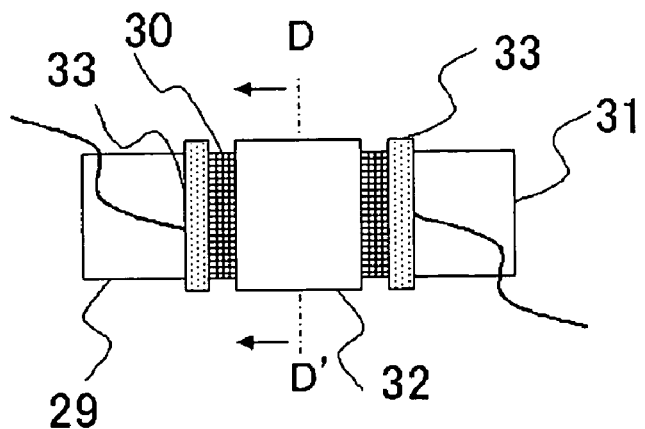
F I G. 6b
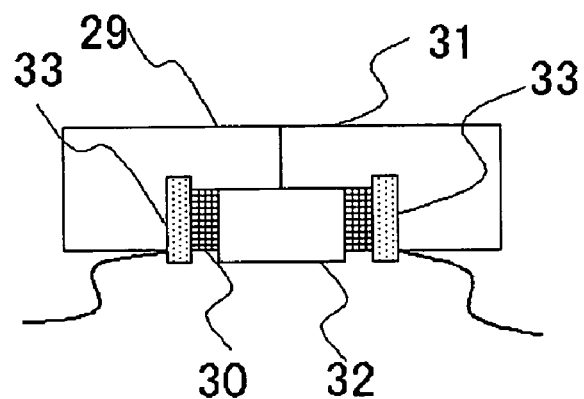
F I G. 6c
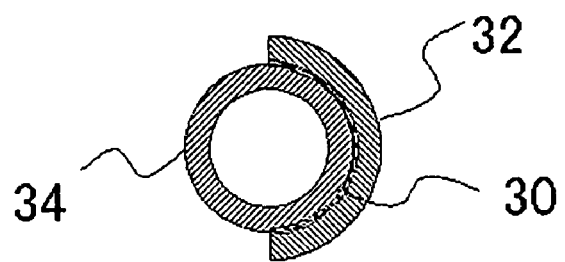

FUSION-BONDED PROCESSED PRODUCT OF RESIN MEMBER, METHOD FOR PRODUCING SAME AND METHOD FOR FUSION-BONDING RESIN MEMBERS

This application is a continuation application of PCT International Application PCT/JP03/00335 filed on 17 Jan. 2003.

FIELD OF THE INVENTION

This invention relates to a resin processed product (fusion-bonding processed product of resin members), produced by fusion-bonding and jointing resin members (two or more resin members fusion-bonded together to a product) through heating by conducting electric current (termed as "conduction heating" herein), and a method and an apparatus for fusion-bonding resin members together by conduction heating. This invention also relates to a resin processed product manufactured by bonding two or more pipes, at least one of which is formed of resin, in particular a resin pipe and a metal pipe.

RELATED ART

Up to now, the EF (electric fusion-bonding) technique has bee in use as a method for fusion-bonding (jointing) resin members, in particular pipes formed of thermoplastic resin. With this method, in fusion-bonding (unifying) the resin members, in particular pipes formed of thermoplastic resin, a dedicated joint, for example, a joint (socket), having embedded therein a metal wire wound to a coil (resistance heating element) is used to conduct the current through the metal wire in the joint to generate heat to fusion-bond (unify) the pipes (see for example the JP Patent Kokai H2-186193).

DISCLOSURE OF THE INVENTION (Problem of the Invention)

However, with the EF technique, the usual practice is to use a dedicated joint (injection molded products) for a resin pipe conforming to various standards in the individual nations (e.g. JIS or ISO), while there lacks universality to products other than those conforming to the standards. Thus, if joints other than the dedicated joints (injection molded products) are manufactured and used for products conforming to the standards and those not conforming to the standards, the joints are cut out of a resin block, such that it is difficult to mount (provide) a metal wire accurately operating for the joints. It is moreover difficult to keep a constant clearance between the resin members, thus giving rise to such problems that carbon tends to be generated from a resin site containing a large amount of air (gap between the resin members) by the enclosed resistance heating elements (heater), the enclosed resistance heating elements (heater) tending to be moved and shorted through the resin fusion-bonded during heating by current, and that an air layer is produced in a gap between the resin members and the joint, with a consequence that the state (effect) of fusion-bonding is influenced by the temperature (environmental temperature) in this gap.

Moreover, since there is a range of allowance for the manufacture of the pipe in the various standards, the pipe produced under the same standard is of an accurately constant size (that is, of a variable size) and can hardly be matched to the dedicated joint or to the joint cut out of the resin block, thus giving rise to such problems that the state of fusion-bonding is not stabilized, the EF technique is mainly a technique of fusion-bonding and unifying the resin pipes and can hardly be applied to the shape of a planar (plate) shape or to a polygonal shape, a single wire is generally used for a metal wire used as a resistance heating element such that the setting for the time of current conduction or the voltage is changed intricately with the length of a metal wire to render it difficult to carry out the fusion-bonding operation.

On the other hand, in the manufacturing method for resin processed products by unifying two or more pipes, at least one of which is formed of resin, in particular a resin pipe and a metal pipe, the design parameters for the products, in particular the mechanical strength, such as tensile strength, in the junction of the pipes, are not optimum.

Hence, there is a demand for a fusion-bonding method for resin members, or between the resin members and a joint, which is free of carbon generation or shorting during conduction heating, unsusceptible to prevailing environmental temperatures and which may be adapted to any shape. There is also a demand for a manufacturing method for a resin processed product manufactured by unifying two or more pipes, at least one being formed of resin, in particular a resin pipe and a metal pipe, in which design parameters for the products, in particular the mechanical strength, at the junction of the pipes, are high and in which the pipes may be jointed readily.

It is therefore an object of the present invention to provide a simpler manufacturing method for resin processed products, manufactured by fusion-bonding and thereby unifying resin members by conduction heating, which is free of carbon generation or shorting during current conduction through the enclosed resistance heating element (heater) and which is not influenced by the environmental temperature, and a method and apparatus for fusion-bonding resin members together, and to develop a joint for the resin members (resin joint). It is another object of the present invention to provide a manufacturing method for a resin processed product, manufactured by unifying two or more pipes, at least one of them being formed of resin, in particular a resin pipe and a metal pipe, in which the design parameters for the products, in particular the mechanical strength, at the junction of the pipes, are high and in which the pipes may be bonded readily.

(Means to Solve the Problem)

The present inventors have conducted eager searches for solving the above problems, and found that, if, when the resin members are fusion-bonded by conduction heating a metal wire(s) in the form of a mesh or a pattern is disposed, as a resistance heating element, in the junction part of the resin members (on the junction surface or its vicinity), the resin members are abutted together, the so abutted state is kept and the current is conducted through the metal wire(s) to yield heat sufficient to fusion-bond the resin members together, the junction surface of the resin members may be improved in strength to solve the problem inherent in the above-described manufacturing method for the resin processed products.

The present inventors have also found that, in unifying two or more pipes, at least one of which is formed of resin, if a resin member is held in a state of being abutted against the outer surface of the resin pipe, with a resistance heating element, having meshed or patterned openings, interposed at a junction between the resin pipe and the resin member, the current is conducted through the resistance heating element for generating heat for fusion-bonding the resin pipe and the resin member together, a stopper is provided on the outer surface of an end portion of the pipe to be jointed to the resin pipe and providing an O-ring on the inner surface thereof, the resin pipes and the resin member are held in a state in which the resin pipes are abutted against each other, so that the O-ring disposed on the inner surface of the end portion of the pipe to be jointed to the resin pipe contacts the outer surface thereof, and the resin member, fusion-bonded to the resin pipe, and the stopper on the outer surface of the end portion of the pipe to be jointed to the resin pipe, are embraced by a sleeve, the resin pipe and the pipe to be jointed thereto may be unified at the junction site with a high mechanical strength. This finding has led to completion of the present invention.

That is, the present invention provides, in one aspect, a method for producing a resin processed product by fusion-bonding and unifying resin members together by conduction heating, in which the method comprises the following steps. This method is sometimes referred to below as 'a method for producing the resin processed product according to the present invention'.

a. A step of abutting resin members together with interposition of a resistance heating element, having meshed or patterned openings, in a junction site of the resin members.

b. A step of conducting the current through the resistance heating element for heating for fusion-bonding the resin members together.

If, in the method for producing the resin processed product according to the present invention, the resin materials used in the resin members are both thermoplastic resins, preferably the same thermoplastic resins, more preferably polyethylene resin, the resin members may be fusion-bonded together more readily, while the junction surfaces of the resin members may be improved in strength.

In particular, in the method for producing the resin processed product according to the present invention, the shape of the resin member is preferably selected from the group of a ring shape and a cylindrical shape. In this case, the resin members may be fusion-bonded together more readily.

The present invention provides, in a second aspect, a method for fusion-bonding resin members together by conducting the current therethrough for heating for unifying the members together, in which the method comprises the following steps. This method is sometimes referred to below as the 'fusion-bonding method of the present invention'.

a. A step of placing a meshed or patterned metal wire(s) as a resistance heating element in a junction site of the resin members and abutting the resin members together to maintain the abutted state of the members.

b. A step of conducting electric current through the meshed or patterned metal wire(s) placed at step a. to heat the metal wire(s) to a temperature sufficient for fusion-bonding.

If, in the fusion-bonding method of the present invention, the resin materials used in the resin members are both thermoplastic resins, preferably the same thermoplastic resins, more preferably polyethylene resin, the resin members may be fusion-bonded together more readily, while the junction surfaces of the resin members may be improved in strength.

In particular, in the fusion-bonding method of the present invention, the shape of the resin member is preferably selected from the group of a ring shape and a cylindrical shape. In this case, the resin members may be fusion-bonded together more readily.

The present invention provides, in a third aspect, an apparatus for fusion-bonding resin members together by conduction heating for unifying the members together, in which the apparatus comprises the following means. This apparatus is sometimes referred to below as the 'fusion-bonding apparatus of the present invention'.

a. means for interposing a meshed or patterned metal wire(s) as a resistance heating element in a junction site of resin members, in unifying the resin members together, and for abutting the resin members together to maintain the abutted state of the members.

b. means for conducting electric current through the meshed or patterned metal wire(s) to heat the metal wire(s) to a temperature sufficient for fusion-bonding.

If, in the fusion-bonding apparatus of the present invention, the resin materials used in the resin members are both thermoplastic resins, preferably the same thermoplastic resins, more preferably polyethylene resin, the resin members may be fusion-bonded together more readily, while the junction surfaces of the resin members may be improved in strength.

In particular, in the fusion-bonding apparatus of the present invention, the shape of the resin member is preferably selected from the group of a ring shape and a cylindrical shape. In this case, the resin members may be fusion-bonded together more readily.

The present invention provides, in a fourth aspect, a resin processed product comprising a fusion-bonded layer formed through openings between the resin members, the fusion-bonded layer being formed by conduction heating, i.e., by conducting electric current through a resistance heating element having meshed or patterned openings, the resistance heating element being interposed in a junction site between the resin members. This resin processed product is sometimes referred to below as 'the resin processed product of the present invention'.

If the resin members are both formed of thermoplastic resins, preferably the same thermoplastic resins, and more preferably polyethylene resins, the junction surfaces of the resin members may be improved in strength.

If, in manufacturing the resin processed product of the present invention, the shape of the resin members is a ring, a cylinder or a combination thereof, the resin members may be fusion-bonded together more readily, so that the resin processed product of the present invention may be produced more readily.

The present invention provides, in a fifth aspect, a joint for resin members, comprising resin members and a heating element, the heating element having openings in the form of a mesh or pattern. This joint is sometimes referred to below as 'the joint of the present invention'.

If, in the joint of the present invention, the resin members are thermoplastic resins, preferably polyethylene resins, the joint may be fusion-bonded to the resin members more readily.

If, in particular, the shape of the resin members in the joint of the present invention is a ring or a cylinder, the resin members may be fusion-bonded together more readily.

Meanwhile, the joint of the present invention may comprise a joint in which the aforementioned heating element is pressed (press-fitted) against the junction surface to the resin member (only lightly thrust against the junction surface to the resin member, with the heating element lying on or in the vicinity of the junction surface), a joint in which the heating element is tack-attached (adhered) to the junction surface to the resin member, or a joint in which the heating element is embedded in the resin member, such as a joint in which the heating element is tack-attached to the junction surface to the resin member and a suitable resin, especially a thin film of resin, is coated thereon, or a joint in which the heating element is embedded in a resin member when casting the resin member.

The present invention provides, in a sixth aspect, a tool for fusion-bonding resin members together, wherein the tool is a heating element having meshed or patterned openings. This tool is sometimes referred to herein as a 'fusion-bonding tool of the present invention'.

The present invention provides, in a seventh aspect, a method for unifying resin pipes together by fusion-bonding caused by heating the resin pipes by electric conduction, in which the method comprises the following steps. This method is sometimes referred to herein as a 'fusion-bonding method for resin pipes of the present invention'.

a. a step of placing a meshed or patterned metal wire, as a resistance heating element, in an abutted junction site of resin pipes, and holding the abutted state.

b. a step of conducting electric current through the meshed or patterned metal wire(s), placed at the step a., to heat the metal wire(s) to a temperature sufficient for fusion-bonding.

If, in the fusion-bonding method for resin pipes of the present invention, the resin pipes are both formed of thermoplastic resins, preferably the same thermoplastic resins, and more preferably polyethylene resins, the resin pipes may be fusion-bonded together more readily and, in addition, the junction surfaces of the resin pipes may be higher in strength.

The present invention provides, in an eighth aspect, a method for producing a resin processed product by unifying two or more pipes, at least one of which is formed of resin, in which the method comprises the following steps. This method is sometimes referred to below as a 'producing method for producing a resin processed product fitted with a sleeve according to the present invention'.

a. a step of holding a resin component in a state of being abutted against the outer surface of a resin pipe, with a resistance heating element, having meshed or patterned openings, being interposed at an abutted junction between the resin pipe and the resin component.

b. a step of conducting electric current through the resistance heating element for generating heat for fusion-bonding the resin pipe and the resin component together.

c. a step of providing a stopper on an outer surface of the end portion of a pipe to be jointed to the resin pipe and providing an O-ring on an inner surface of the pipe to be jointed at an end portion thereof.

d. a step of holding the resin pipe and the pipe to be jointed in a state in which the resin pipe is abutted against the resin pipe to be jointed, so that the O-ring disposed on the inner surface of the end portion of the pipe to be jointed contacts the outer surface of the resin pipe.

e. a step of embracing the resin component, fusion-bonded to the resin pipe, and the stopper on the outer surface of the end portion of the pipe to be jointed to the resin pipe, by a sleeve.

In the producing method for producing a resin processed product fitted with a sleeve according to the present invention, there is no limitation to the pipe to be unified (jointed), such that resin pipes or metal pipes, for example, may be used. The pipe to be unified may be unified readily to the resin pipe and, in addition, the junction between the pipe to be unified and the resin pipe may be higher in strength.

The present invention provides, in a ninth aspect, a resin processed product comprising a resin processed member having a fusion-bonded layer, which fusion-bonded layer is interposed in a junction area between a resin pipe and a resin component, formed by conducting electric current through a resistance heating element having meshed or patterned openings, and which fusion-bonded layer is formed through the openings between the pipe of resin and the resin component, a pipe to be connected to the resin pipe, which pipe to be connected has a stopper on the outer surface of the end portion thereof, an O-ring disposed for contacting the outer surface of the end portion of the resin processed component and the inner surface of the end portion of the pipe to be connected to the resin pipe, and a sleeve for embracing the stopper on the outer surface of the end portion of the pipe to be connected to the resin pipe. The resin processed product is sometimes referred to as a 'resin processed product fitted with a sleeve according to the present invention'.

In the resin processed product fitted with a sleeve according to the present invention, there is no limitation to the pipe to be unified, such that resin pipes or metal pipes, for example, may be used. There may be provided a resin processed product in which the pipe to be unified and the resin pipe may be unified to each other extremely readily, and in which the junction between the pipe to be unified and the resin pipe may be improved in strength.

(Preferred Embodiment of the Invention)

In the following, certain preferred embodiments are explained in detail.

The present invention comprises several aspects, namely a method for producing resin processed products, produced on fusion-bonding and unifying resin members (two or more members that may be bonded together to form a product) by conduction heating, a method for fusion-bonding resin members together by conduction heating, and an apparatus for fusion-bonding the resin members together by conduction heating. Although the following explanation is centered about the method for producing a resin processed product, and fusion-bonding methods and apparatus, these are merely illustrative of the present invention.

(Method for Producing Resin Processed Products of the Present Invention)

The method for producing the resin processed products of the present invention comprises fusion-bonding resin members, preferably ring- or cylindrically-shaped resin members, by conduction heating, for unifying the members together, and comprises:

a. a step of abutting the resin members together with interposition of a resistance heating element, having meshed or patterned openings, in a junction site of the resin members, and b. a step of conducting electric current through a resistance heating element for generating heat for fusion-bonding the resin members together.

Specifically, a resistance heating element, having meshed or patterned openings, is selected in keeping with the size and the shape of the resin members to be fusion-bonded and unified together, and is interposed (placed) in the junction site of the resin members. A resin member, on which is placed the resistance heating element, is abutted against a resin member to be unified thereto. The resistance heating element, thus interposed, is supplied with current and thereby heated to fusion-bond the resin members together.

The junction site of the resin members comprises the bonding surfaces of the resin members or the vicinity thereof.

According to the present invention, the resistance heating element, 'interposed' in the junction site of the resin members, may comprise such a resistance heating element which is in a press-fitted state against the bonding surfaces of the resin members, with the resistance heating element being lightly pressed against the bonding surface or lying on or in the vicinity of the bonding surface, such a resistance heating element in a tack-unified (adhered) state to the bonding surfaces of the resin members, and such a resistance heating element in a state of being embedded in the resin members by a method that comprises tack-bonding a resistance heating element to the bonding surfaces of the resin members and applying a coating of an optional resin, especially in the from of a thin film, or a method of molding so that the resistance heating element is embedded from the outset in the resin members. Meanwhile, the resin member is to be selected in meeting with the resin member and the resins for the resin members to be used in the present invention, as will be explained subsequently, may be used.

With the present method, the resistance heating element may be selected freely as to shape, and may be processed (or worked), such as by bending, in meeting with the shape of the resin member to be unified, such that the resistance heating element may be fusion-bonded and unified to any suitable shape of the resin member, such as a tubular form, such a ring or cylindrical shape, or a plate shape. Additionally, since the resistance heating element may conform to the shape of one of the resin members and hence the gap between the resin members to be fusion-bonded together (two or more resin members to be unified to each other to form a product) is reduced or eliminated to provide for insusceptibility to environmental temperatures. Moreover, since the resin member, melted by current passage through the resistance heating element, is charged into the meshed or patterned openings in the resistance heating element, and the resin member, melted by current passage through the resistance heating element, and the other resin member, melted in similar manner, are compatibly mixed (melted and mixed for re-construction (cured as one with each other)), so that the strength of the junction surfaces of the resin members may be rendered equivalent to that of the resin member itself. A typical manufacturing method for the resin processed products of the present invention is shown in FIG. 1.

There is no particular limitation to the resin members used in the present invention, such that any suitable resin melted by heat and re-constructed (that is, cured as one) may be used. Preferably, thermoplastic resins are used. These thermoplastic resins may be enumerated by polyolefin resins, such as polyethylene or polypropylene, vinyl resins, such as polyvinyl chloride or polystyrene, acrylic resins, such as polymethyl methacrylate, and ABS resins. More preferably, polyolefin resins, and most preferably, polyethylene resins are selected. In selecting the resin members, different resins, which do not interfere with fusion-bonding of the resin members, such as polyethylene resins and polypropylene resins, may be selected as resin members to be fusion-bonded together (that is, unified) may be selected. It is however preferred to select resin members superbly compatible with each other, preferably the resin members formed of the same resin material.

As for the resistance heating element, there is no particular limitation provided that the element used is current conductive, exhibits a resistance value during conduction of the current therethrough and is routinely used as a low resistance heating element, or alloys thereof. Examples of the resistance heating element include metals, such as iron or steel or tungsten, a wire material mainly composed of these metals and alloys, such as iron-chromium or nickel-chromium. Of these, iron or steel and iron-chromium are most preferred in light of universal use and commercial availability.

As for the resistance heating element, having meshed or patterned openings, used in the present invention, it is sufficient if the current may flow evenly through the entire resistance heating element, and the resistance heating element is heated evenly.

For example, the resistance heating element to be used may be selected in dependence upon the shape, size or the properties (physical properties) of the resin members to be fusion-bonded together. For example, if the resistance heating element is applied to a resin pipe of polyethylene, with an outer diameter of 114 mm ($\Phi$114), preferably the size of the openings of the resistance heating element is approximately 1 to 3 mm, more preferably the size of the openings of the resistance heating element is approximately 1 to 3 mm and the thickness of the metal wire used for the resistance heating element is approximately 0.1 to 0.5 mm ($\Phi$0.1 to 0.5) and most preferably the size of the openings of the resistance heating element is approximately 2 mm and the thickness of the metal wire used for the resistance heating element is approximately $\Phi$0.2.

The resistance heating element, having meshed or patterned openings, used in the present invention, is readily available, such that a metal wire processed to a meshed or patterned shape, such as a lattice shape, may be used. It is possible to use commercial expanded metal, such as stainless steel mesh for hobbies, may be used. As the resistance heating element, having meshed or patterned openings, used in the present invention, not only the resistance heating element, having complete meshed or patterned openings, but also the resistance heating element, having openings, may be used.

As for the method for interposing the resistance heating element between the two or more resin members, there is no particular limitation, such that the resistance heating element may be interposed (mounted or tack-mounted or adhered) by e.g. a method for heat fusion-bonding using e.g. a solder trowel. The resistance heating element may be tack-mounted using a U-shaped binding strip formed of the same metal material as the resistance heating element. Or, the resin member may be molded so that the resistance heating element is embedded from the outset in the inside of the resin member.

In the present invention, there is no particular limitation to the method for abutting the resin members to each other. For example, a routine fixing method, e.g. a method employing a jig, such as a clamp, may be used for holding, or a method wrapping a string- or belt-like material capable of provisional mounting, such as a wire, a rope or a tape, preferably such material also exhibiting heat resistance, for holding, may be used.

In the present invention, special caution must be taken care as to shorting of the resistance heating element (metal wire used as the resistance heating element). Thus, if there is a latent fear of shorting of the ends of the resistance heating element, an insulating element, such as an element of vinyl or rubber, is interposed, as necessary, in order to prevent the ends from contacting with each other. For conducting the current through the resistance heating element, an electrode terminal (current conducting plug) may be a resin processed product fusion-bonding device. It is however desirable that the current flows evenly through the resistance heating element in its entirety or the entire surface of the resistance heating element to cause uniform heat generation.

As for the current conducting conditions in the present invention, there is no particular limitation, provided that the resistance heating element may be heated to a temperature sufficient to cause the resin members of interest to be fusion-bonded together. Thus, the current conducting conditions need only to be selected in dependence upon the sort or the melting point of the resin members used as well as the resistance value of the metal wire to be used for the resistance heating element. Preferably, the current is caused to flow until the presence of the dissolved polyethylene resin is noticed in the void produced on the portion of the junction surface of the resin members not pressured to the resistance heating element. If the presence of the dissolved polyethylene resin has been noticed, the resin members are fusion-bonded together with an extremely high mechanical strength, such as extremely high tensile strength. For example, with a polyethylene resin pipe (outer diameter Φ114) and with a resistance heating element with a size of the opening of 2 mm and a metal wire of the resistance heating element with a thickness of Φ0.2, the current conducting conditions include approximately 15V for approximately 120 to 130 seconds.

According to the present invention, any superfluous portions, exuded from the resin members, of the resistance heating element, after the resin members have been fusion-bonded to each other, may readily be removed, such as severing with scissors.

Resin processed products, that is or may be manufactured in accordance with the method for producing the resin processed product according to the present invention, are also comprised within the present invention.

(Fusion-Bonding Method of the Present Invention)

The fusion-bonding method of the present invention is a method for fusion-bonding resin members together by conduction heating for unifying the members together, comprising:

a. placing a meshed or patterned metal wire(s) as a resistance heating element in a junction site of the resin members and abutting the resin members together to maintain the abutted state of the members, and
b. conducting electric current through the meshed or patterned metal wire(s) placed at the step a. to heat the metal wire to a temperature sufficient for fusion-bonding.

It is also possible to add steps other than the steps a and b to carry out the present invention more readily. The method added by these steps is also comprised within the present invention.

First, in the above step a, a suitable metal wire is selected and disposed in a proper fashion, as explained previously, and the resin members are abutted to each other and maintained in this condition. The current is then flown through the metal wire(s), in the step b, to the metal wire(s), arranged as in the step a, to heat the resin members to a temperature sufficient to fusion-bond the members together, to fusion-bond the members to each other.

As for the metal wire, reference is to be made to the foregoing description, pertinent to the resistance heating element in the method for producing the resin processed product according to the present invention.

In the present invention, the metal wire, 'arranged' in the junction area of the resin members, may include a metal wire pressed onto the junction surface of the resin members, a metal wire tack-mounted (adhered or arranged) to the junction surface of the resin members or a metal wire embedded in the resin member.

(Fusion-Bonding Device of the Present Invention)

The fusion-bonding device of the present invention is a device for fusion-bonding resin members together by conduction heating for unifying the members together, and comprises:

a. means for interposing a meshed or patterned metal wire(s) as a resistance heating element in a junction site of the resin members, in unifying the resin members together, and abutting the resin members together to maintain the abutted state of the members, and
b. means for conducting electric current through the meshed or patterned metal wire to heat the metal wire to a temperature sufficient for fusion-bonding.

The method for producing the resin processed product of the present invention or the contents stated in the fusion-bonding method of the present invention may be referred to for working out the present invention. An example of the fusion-bonding device of the present invention is shown in FIGS. 2 to 6.

Among means for 'interposing' a metal wire in the junction area of the resin members, there are means for pressing the resin members and the metal wire together, means for tack-mounting (arranging) the metal wire to the resin member and means for embedding a metal wire in the resin member, as explained previously.

As for means a. there is no particular limitation to the means for interposing the metal wire in the junction area of the resin members for holding the resin members together. The so abutted state may be maintained by a routine securing method, as also explained previously.

As for means b, the resin members may readily be fusion-bonded together and unified by conducting the current through the metal wire(s) for heating to a temperature sufficient for fusion-bonding the resin members together.

(Resin Processed Product of the Present Invention)

The resin processed product of the present invention comprises a fusion-bonded layer formed through said openings between the resin members, in which the fusion-bonded layer is formed by conduction heating the current through a resistance heating element having meshed or patterned openings. The resistance heating element is interposed in a junction site between the resin members. Such resin processed product is unexceptionally comprised within the present invention.

The 'fusion-bonded layer' is a layer formed by one of the resin members, fusion-bonded in the openings by current conduction through and heating of the resistance heating element, and the other resin member, simultaneously fusion-bonded, with the two members being compatibly mixed, that is, fusion-bonded-mixed and re-constructed (solidified into one solid body).

An example of the resin processed product of the present invention is shown in FIG. 7. It is noted that the cross-sectional view of the resin processed product, shown in FIG. 7c, is a schematic view, such that, in actuality, a definite fusion-bonded layer is not necessarily formed.

As for the method for producing the resin processed product, reference is had to the contents stated in the above method for producing the product.

(Joint of the Present Invention)

The joint for resin members according to the present invention comprises a resin component and a heating element. The heating element has openings in the form of a mesh or pattern.

More concretely, a resin component (member) to be used as a joint is selected in keeping with the size or the shape of the resin member(s) to be unified together (one or more members of resin to be unified to give a desired product). A heating element, having openings in the form of a mesh or pattern, is selected in keeping with the size and the shape of the resin member(s) to be unified together and the joint (a resin member, i.e., component to be used as a joint). The resistance heating element is arranged to the resin component to form a joint, and the resin member and the joint are abutted together. The heating element, provided to the joint, is heated to fusion-bond the resin member and the joint to each other.

The heating element 'arranged' on the resin component used as the joint may include those pressed onto the aforementioned resin component, especially to the inner surfaces thereof, those tack-mounted (arranged) to these inner surfaces, and those embedded in the resin component by a method of tack-mounting the heating element to the resin component, especially to the inner surfaces thereof, and coating with a suitable resin, and those consisting in molding the heating element from the outset in molding the resin components.

The resin component used as the joint in the present invention may be the same as the aforementioned resin member, as explained in connection with the manufacturing method of the resin processed product of the present invention.

In selecting the resin component used as the joint, the resin component may be selected, in keeping with the properties (physical properties) of the resin members to be unified (bonded), so that the resin component used as the joint will not interfere with fusion-bonding to the resin member to be so unified. Thus, although different resins may be selected as the resin member used as the joint and the resin members to be unified (bonded), such as selecting a polyethylene resin for the resin members to be unified (bonded) and selecting a polypropylene resin for the resin component used as the joint, it is preferred to use the resins compatible with each other, while it is more preferred to use the same resin.

There is no particular limitation to the shape of the joint of the present invention, such that the joint shape may be selected in keeping with the resin members to be unified (bonded). It is noted that the joint selected may be split into two or three sections. For example, if the shape of the resin members to be unified (bonded) is cylindrically-shaped, a joint of a corresponding circular (or annular) ring or cylindrical shape may be split into two to form two semicircular sections which may then be used as the joint.

As a method for arranging the heating element as a joint, reference may be made to the contents stated in connection with the manufacturing method of the present invention. Meanwhile, the resin component may be molded from the outset so that the heating element is disposed in an embedded manner.

As for the method for conducting (flowing) the current for heating the heating element and the current conducting conditions, reference may be made to the contents stated above in connection with the manufacturing method for the resin processed product of the present invention.

There is no particular limitation to the method for abutting the joint such that routinely used securing methods such as those described above may be used.

The superfluous portions of the heating element, produced on fusion-bonding and connection of the resin members to be unified (bonded), that is, exuded from the joint, may be readily removed, as also explained previously.

The resin processed product, which has been produced or may be produced using the joint of the present invention, is also encompassed by the present invention.

(Fusion-Bonding Tool)

The tool for fusion-bonding resin members together, according to the present invention, is a heating element having meshed or patterned openings. As for the relevant method, reference may be made to the contents of the resistance heating element having the openings in the form of a mesh or pattern.

(Fusion-Bonding Method)

The aforementioned fusion-bonding method of the present invention is applied to a case where the resin members to be bonded together are each a hollow-shaped resin member, preferably a ring- or cylindrically-shaped resin member and more preferably a resin pipe. As for the relevant method, reference may be made to the fusion-bonding method of the present invention described previously.

(Method for Producing a Resin Processed Product Fitted with a Sleeve)

The method for producing a resin processed product by unifying pipes at least one of which is formed of resin, with the product being fitted with a sleeve, comprises:

a. a step of holding a resin component (member) in a state of being abutted against an outer surface of a resin pipe, with a resistance heating element, having meshed or patterned openings, being interposed at a junction between the resin pipe and the resin component, b. a step of conducting electric current through the resistance heating element for generating heat for fusion-bonding the resin pipe and the resin component together, c. a step of providing a stopper on an outer surface of the end portion of a pipe to be jointed to the resin pipe and providing an O-ring on an inner surface of the pipe to be jointed at an end portion thereof, d. a step of holding the resin pipe and the pipe to be jointed in a state in which the resin pipe is abutted against the pipe to be jointed, so that the O-ring arranged on the inner surface of the end portion of the pipe to be jointed to the resin pipe contacts the outer surface of the resin pipe, and . a step of embracing the resin component, fusion-bonded to the resin pipe, and the stopper on the outer surface of the end portion of the pipe to be jointed to the resin pipe, by a sleeve.

By way of a concrete example, a resistance heating element, having openings in the form of a mesh or a pattern, is selected, in keeping with the size or shape of the resin pipes to be fusion-bonded/jointed (unified), and is interposed (arranged) in a junction area of the resin members. The resin member, and the resin pipe to be unified thereto, are abutted to each other with the resistance heating element in-between. The current is conducted through the interposed resistance heating element for heating to fuse/bond (unify) the resin member and the resin pipe to each other to produce a resin processed product. A stopper is provided on the outer surface of the end portion of the pipe to be unified to the resin pipe and an O-ring is arranged on the inner surface of the pipe to be unified.

The 'stopper' is abutted against an inward projection formed on the inner sleeve surface to suppress axial sliding of the resin component with respect to a counterpart pipe so that the stopper is engaged with the inward projection on the inner sleeve surface. This causes the resin component to be axially retained within the sleeve against the axial relative movement with respect to the pipe to be unified (typically, the pipe to be inserted).

The resin pipe and the pipe to be unified thereto may be unified together by abutting the resin processed product against the pipe, keeping the so abutted state and by having the stopper embraced by the sleeve. An example of the manufacturing method of the resin processed product is shown in FIG. 8. As the resin component, with interposition of the resistance heating element, a molded product obtained on molding resin with the resistance heating element placed therein in molding may be used.

The type of the resin member to be used in the present invention is as described herein previously.

The shape or the size of the resin member, employed in accordance with the present invention, are selected depending on the shape of the resin pipes, to be bonded together, the shape of the stopper or the sleeve, as later explained. For example, a ring-shaped or cylindrically-shaped resin component is selected in keeping with the shape of the resin pipe or the stopper, and with the sleeve, and split in two or more sections, such as two or three sections, for use as the resin component.

There is no particular limitation to the position of abutting the resin member to the resin pipe. Such position may be selected depending on the stopper position or the sleeve size or shape.

There is no particular limitation to the type of the resin pipe used in the present invention, such that any suitable resin fusion-bonded by heat and re-constructed with the resin component (cured as one with the resin component) may be used. Preferably, the resin pipe is formed of a thermoplastic resin. The thermoplastic resin may be enumerated by polyolefin resins, such as polyethylene or polypropylene, vinyl resins, such as polyvinyl chloride or polystyrene, acrylic resins, such as polymethyl methacrylate, and ABS resin. Of these, polyolefin resins are preferred, and polyethylene resins are most preferred. In selecting the resin components, different resins, such as polyethylene and polypropylene resins, may be selected, however, the different resins compatible with each other, and preferably the same resin, is selected.

As for the resistance heating element, what has already been stated is valid.

The resin member, having the resistance heating element, 'interposed' therein, may comprise such a resistance heating element which is in a pressured state against the resin member, in particular with the inner surface thereof, a resistance heating element in a tack-unified (fitted) state to the against the resin component, in particular with the inner surface thereof, and such a resistance heating element in a state of being embedded in the resin member by a method consisting in tack-bonding a resistance heating element against the resin component, in particular with the inner surface thereof, and applying a coating of an optional resin, or a method of molding so that the resistance heating element is embedded from the outset in the resin member.

There is no particular limitation to the shape or the size of the resistance heating element, provided that the current may flow evenly through the element in its entirety or on the entire surface of the element, and that the element is thereby heated evenly. For example, the resistance heating element to be used may be selected in dependence upon the shape, size or the properties (physical properties) of the resin members to be fusion-bonded together. For example, if the resistance heating element is applied to a resin pipe of polyethylene, with an outer diameter of 114 mm ($\Phi$114) and a width of 30 mm, preferably the size of the openings of the resistance heating element is approximately 1 to 3 mm, more preferably the size of the openings of the resistance heating element is approximately 1 to 3 mm and the thickness of the metal wire used for the resistance heating element is approximately 0.1 to 0.5 mm ($\Phi$0.1 to 0.5) and most preferably the size of the openings of the resistance heating element is approximately 2 mm and the thickness and the width of the metal wire used for the resistance heating element is approximately $\Phi$0.2 and 20 mm, respectively.

As for abutting a resin member, having a resin member abutted against the outer surface of the end portion of the resin pipe, with the resistance heating element having openings in the shape of a mesh or a pattern in a junction area with respect to the resin pipe, and holding the resin member in this abutted state, what has been said above applies.

As for fusion-bonding the resin pipe and the resin member, what has been said above applies.

There is no particular limitation to the pipe to be unified to the resin pipe, such that a resin pipe, such as a polyethylene resin pipe or a vinyl chloride pipe, or a metal pipe, such as an iron pipe, may be selected.

There is no particular limitation to the method for providing a stopper to the outer surface of the end portion of the pipe to be bonded to the resin pipe. For example, a convexed (protruding) portion produced on forming a groove in the outer surface of the end portion of the pipe to be unified may be used as a stopper, or the pipe to be unified may be molded to form a desired stopper from the outset.

There is also no limitation to the shape of the stopper, such that a ring of a desired width formed completely encircling the pipe to be unified to a desired height from the outer surface (rim) of the pipe to be unified or from the bottom of a groove provided in the outer surface (rim) of the end portion of the pipe to be unified may be used as a stopper, or a plural number of stoppers of a desired height from the outer surface of the pipe to be unified or of a desired height, width and a length from the bottom of the groove formed in the outer surface of the pipe to be unified, may be used as a stopper. For example, the stopper may be provided in the form of a ring completely encircling the outer periphery of the pipe to be unified, to a height of approximately 3 mm from the outer surface of the pipe to be unified, or to a height of approximately 3 mm from the bottom of the groove formed in the outer surface of the end portion of the pipe to be unified, that is, with a groove depth of approximately 3 mm, that is, with a width of approximately 3 mm. Alternatively, a plural number of stoppers, with a height of approximately 3 mm from the outer surface of the pipe to be unified, or with a height of approximately 3 mm from the bottom of the groove formed in the outer surface of the end portion of the pipe to be unified, that is, with a groove depth of approximately 3 mm, a width of approximately 3 mm and a length of approximately 5 mm, may be used as a stopper.

There is no particular limitation to the position of providing the stopper. That is, the position of providing the stopper is selected depending on the position of abutting the resin member (component) to the resin pipe and on the size, shape and the function of the sleeve.

There is again no limitation to the O-ring. The O-ring may be selected as to the size or the hardness from standard products of, for example, the JIS standard, ARP standard or the ISO standard, depending on the desired function, or may be molded to a desired size or hardness.

It is not particularly difficult to arrange the O-ring on the inner surface of the end portion of the pipe to be unified. For example, a groove may be formed in register with the O-ring in the inner surface of the end portion of the pipe to be unified. The O-ring may then be mounted in contact with the groove.

As for the method of holding the resin pipe in abutment against the outer surface of the end portion of the resin pipe, so that the O-ring arranged on the inner surface of the end portion of the pipe to be unified is contacted with the outer surface of the end portion of the resin pipe, what has been said in connection with the method of abutting the resin members together applies.

There is no particular limitation to the type, shape or size of the sleeve, provided that the sleeve used is able to hold the resin member fusion-bonded/bonded to the resin pipe and the stopper on the outer surface of the end portion of the pipe to be unified.

There is no particular limitation to the method of embracing by the sleeve, provided that an inward projection formed on the inner sleeve surface is abutted against the stopper on the inner sleeve surface to stop the axial sliding of the sleeve of the resin member against the counterpart side pipe so that the inner projection is engaged with the stopper on the inner surface of the sleeve whereby the resin member is axially constrained in the sleeve to cause the pipe being unified (typically being inserted) to be held in the sleeve against relative axial movement. For example, a ring-like sleeve or a cylindrically-shaped sleeve may be selected in keeping with the form of the resin pipe or the stopper and split in two or more sections, such as two or three sections, and the so formed sleeve may then be used for embracing. Meanwhile, after embracing by the above method, the so split sleeve sections may be unified by welding, or the outer surface of the so split sleeve sections may be connected and secured, using e.g. a wire. Or, an opening may be bored through each of the split sleeve sections and e.g. a wire may be inserted in the opening for connecting and securing the sleeve sections.

(Resin Processed Product Fitted with a Sleeve)

The resin processed product, fitted with a sleeve, according to the present invention, comprises a resin processed member having a fusion-bonded layer, which fusion-bonded layer is interposed in a junction area between a resin pipe and a resin member, formed by conducting the current through a resistance heating element having meshed or patterned openings, and a pipe to be connected to said resin pipe. The pipe has a stopper on the outer surface of the end portion thereof and the fusion-bonded layer is formed through the openings between the resin pipe and the resin member (component). The resin processed product, fitted with a sleeve, according to the present invention, also comprises an O-ring arranged for contacting the outer surface (rim) of the end portion of the resin pipe and the inner surface (rim) of the end portion of the pipe to be connected to the resin pipe, and a sleeve for embracing the stopper on the outer surface of the end portion of the pipe to be connected to said resin pipe.

As for the method relevant to the resin processed product, fitted with a sleeve, according to the present invention, what has been said in connection with the method for producing the resin processed product fitted with a sleeve according to the present invention applies. An example of the resin processed product fitted with a sleeve, produced by the method for producing the resin processed product fitted with a sleeve according to the present invention is shown in FIG. 9.

BRIEF DESCRIPTION OF THE DRAWINGS

FIG. 1 shows an example of the method for producing a resin processed product according to the present invention. For example, cylindrically-shaped resin members (resin pipes) and a semicircular resin member (joint) are unified together. In the figure, a resin processed product of the present invention is produced in the order from a to f. A resin member, paired to the semicircular resin member, may be fusion-bonded to an opposite position with respect to the already unified semicircular resin member.

[FIG. 2]

FIG. 2a shows the fusion-bonding device from its front side.

FIG. 2b depicts a plan view of the fusion-bonding device (a view looking from above the fusion-bonding device.

FIG. 2c shows a resistance heating element used in the fusion, bonding device.

[FIG. 3]

FIG. 3a shows the fusion-bonding device from its front side.

FIG. 3b depicts the cross-section of the fusion-bonding device taken along line A-A' in FIG. 3a.

[FIG. 4]

FIG. 4a shows the fusion-bonding device from its front side.

FIG. 4b shows the cross-section of the fusion-bonding device taken along line B-B' of FIG. 4a.

FIG. 4c shows a cross-section of the fusion-bonding device taken along line L-L' of FIG. 4a.

[FIG. 5]

FIG. 5a shows the fusion-bonding device from its front side.

FIG. 5b shows the fusion-bonding device from its upper side.

FIG. 5c depicts the cross-section of the fusion-bonding device, taken along line C-C' of FIG. 5a.

FIG. 5d depicts the cross-section of the fusion-bonding device, taken along line M-M' of FIG. 5a.

[FIG. 6]

FIGS. 6a to 6c show an example of the fusion-bonding device according to the present invention. As an example, a semi-circular resin member (joint), having a resistance heating element tack-attached thereto, is abutted against the vicinity (on the joint portion) of the junction surfaces of the cylindrically-shaped resin members (resin pipes).

FIG. 6a shows the fusion-bonding device from its front side.

FIG. 6b shows the fusion-bonding device from its upper side.

FIG. 6c depicts the cross-section of the fusion-bonding device, taken along line D-D' of FIG. 6a.

[FIG. 7]

FIG. 7a shows, as an example of the resin processed product according to the present invention, two cylindrically-shaped resin members (resin pipes) unified to a ring-shaped resin member (joint).

FIG. 7b shows the resin processed product from its front side.

FIG. 7c shows a cross-section of the resin processed product, taken along line E-E' of FIG. 7b. There is a fusion-bonded layer, formed by fusion-bonding the resin members and the joint together by heating caused by conducting the current through the resistance heating element, on the junction surfaces of the resin members (resin members 1 and 2) and on the junction surfaces between the resin members and the joint (resin member 3). The fusion-bonding together causes the curing (hardening) of the resin members and the joint unified together.

FIG. 8 shows an example of a method for producing a resin processed product provided with a sleeve. As an example, a resin pipe and a pipe to be connected thereto are unified together using a sleeve. The resin processed product provided with a sleeve is produced in the sequence of from a to f.

[FIG. 9]

FIG. 9a shows the resin processed product fitted with the sleeve from the front side.

FIG. 9b shows the resin processed product fitted with the sleeve from above.

FIG. 9c shows a cross-section of the resin processed product fitted with the sleeve taken along the direction F-F' in FIG. 9b.

FIG. 9d shows a cross-section of the resin processed product fitted with the sleeve taken along the direction G-G' in FIG. 9c.

Figure 1A:
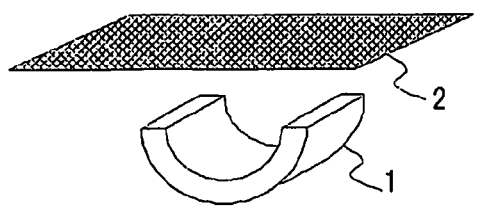
[FIG. 1]
Figure 1B:
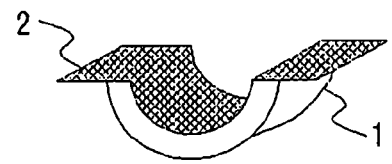
Figure 1C:
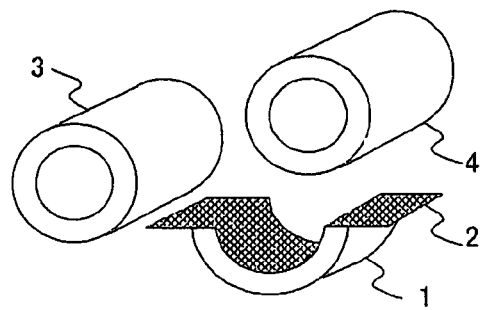
Figure 1D:
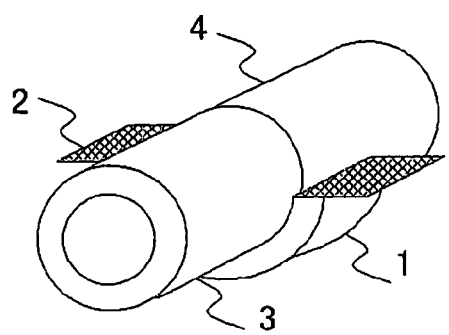
Figure 1E:
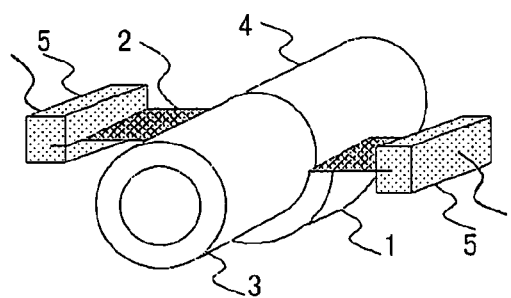
Figure 1F:
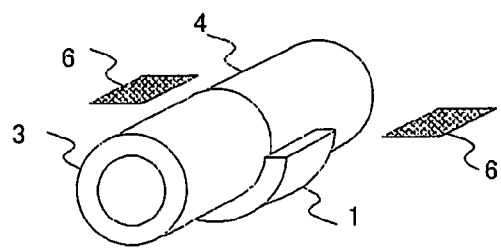
Figure 2A:
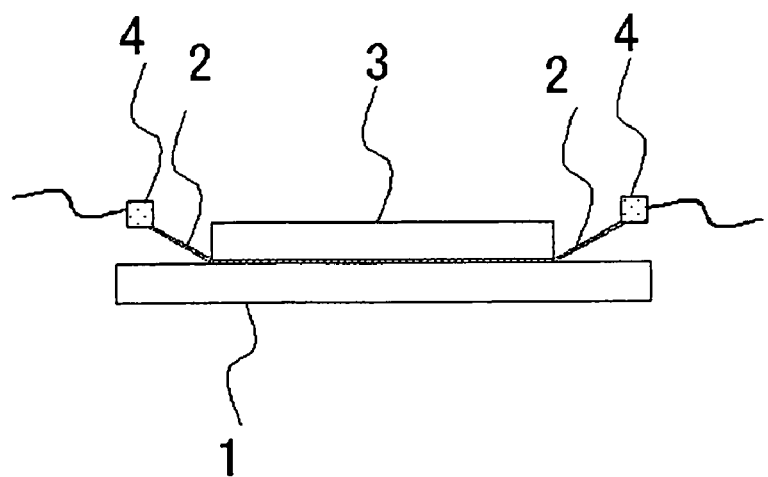
FIGS. 2a to 2c show an example of a fusion-bonding device of the present invention. As an example, a resistance heating element is interposed in the bonding site of plate-shaped resin members.
Figure 2B:
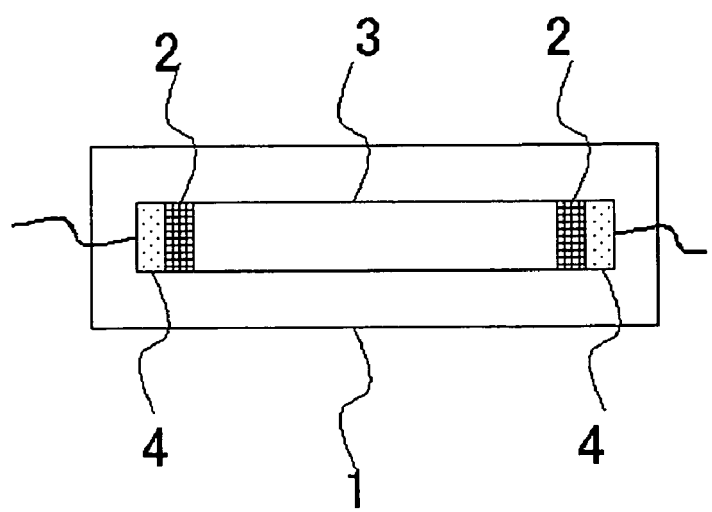
Figure 2C:
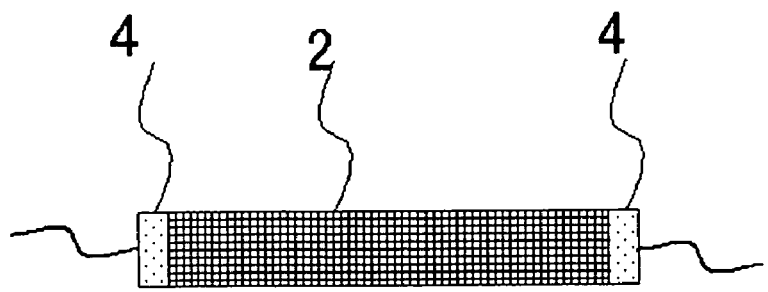
Figure 3A:
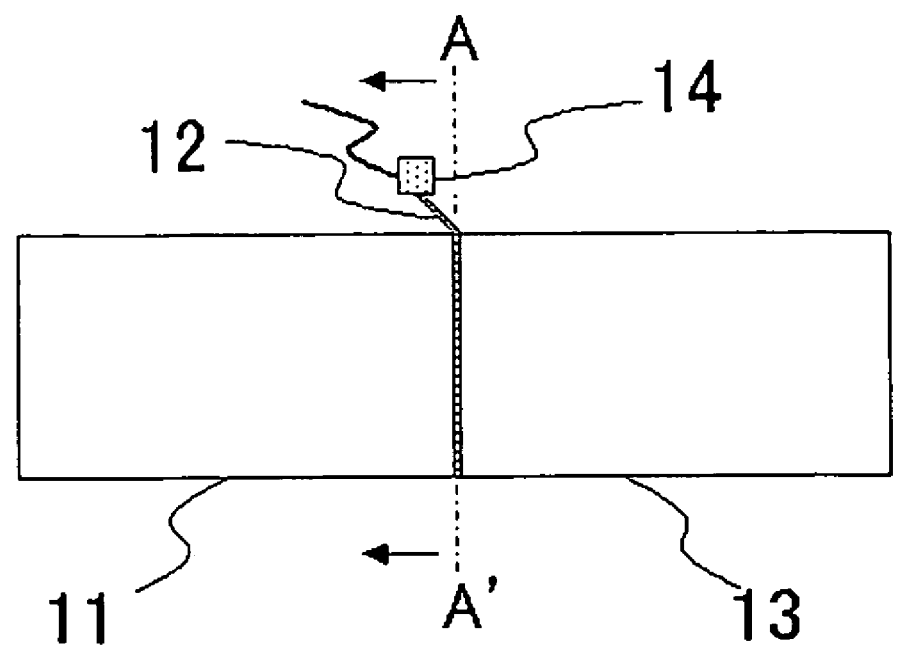
FIGS. 3a and 3b show an example of a fusion-bonding device of the present invention. As an example, a resistance heating element is interposed in the junction site of the cylindrically-shaped resin members.
Figure 3B:
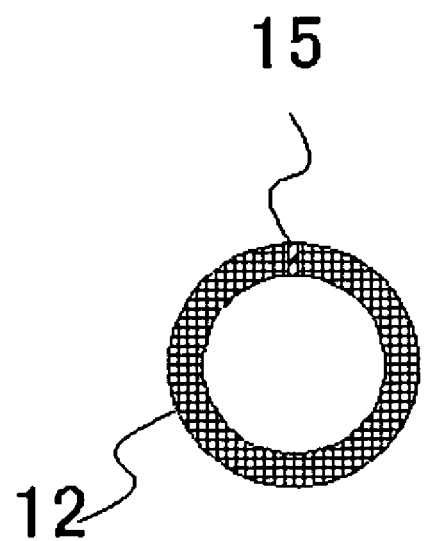
Figure 4A:
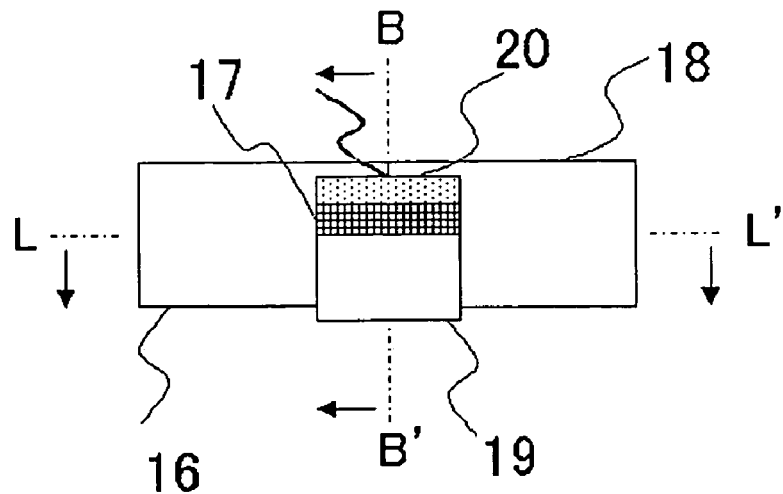
FIGS. 4a to 4c depict an example of the fusion-bonding device according to the present invention. As an example, a semicircular resin member or joint (a half ring-shaped resin member and a resistance heating element tack-attached thereto) is abutted against the vicinity (on the joint portion) of the junction surfaces of the cylindrically-shaped resin members.
Figure 4B:
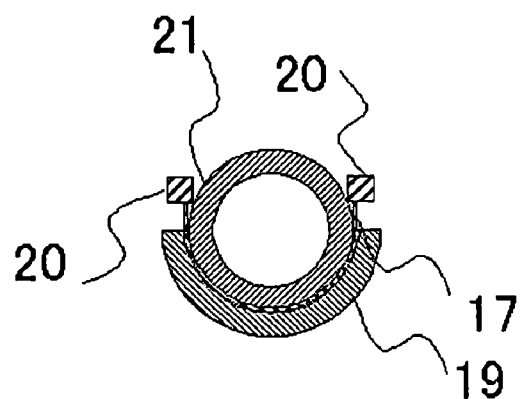
Figure 4C:
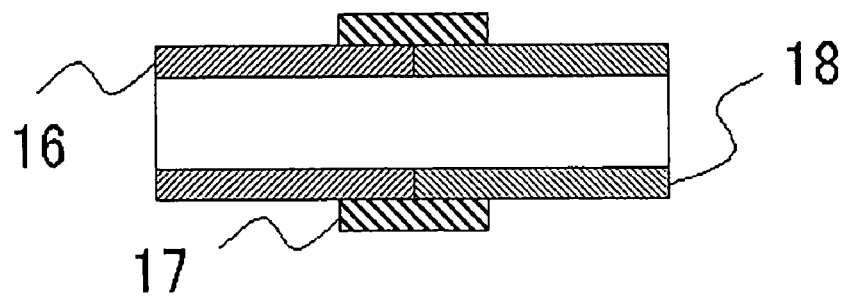
Figure 5A:
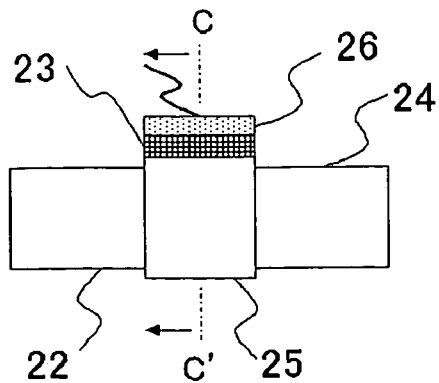
FIGS. 5a to 5d show an example of a fusion-bonding device of the present invention. As an example, a ring-shaped resin member (joint), having a resistance heating element tack-attached thereto, is abutted against the vicinity (on the joint portion) of the junction surfaces of the cylindrically-shaped resin members (resin pipes).
Figure 5B:
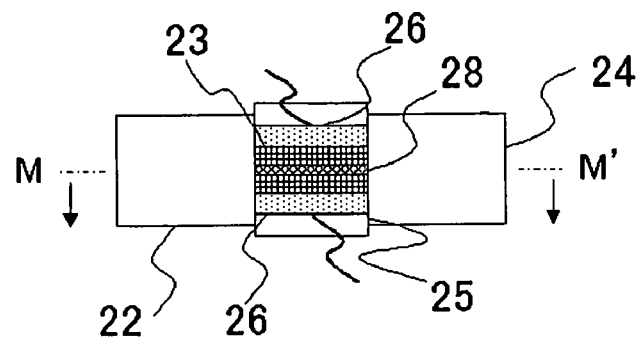
Figure 5C:
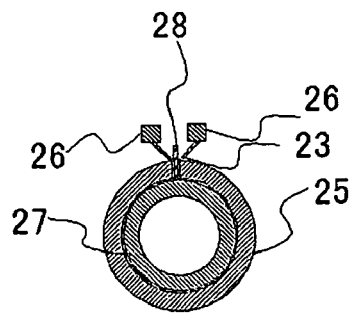
Figure 5D:
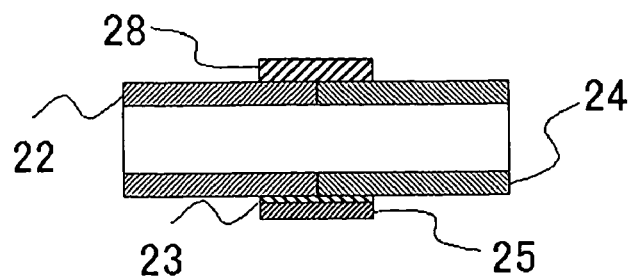
Figure 7A:
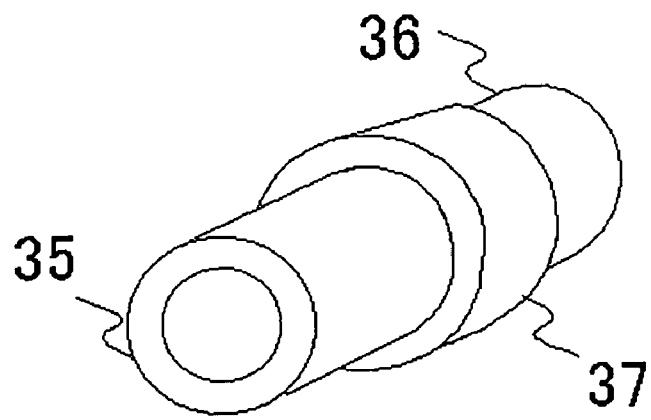
FIGS. 7a to 7c show an example of a resin processed product according to the present invention.
Figure 7B:
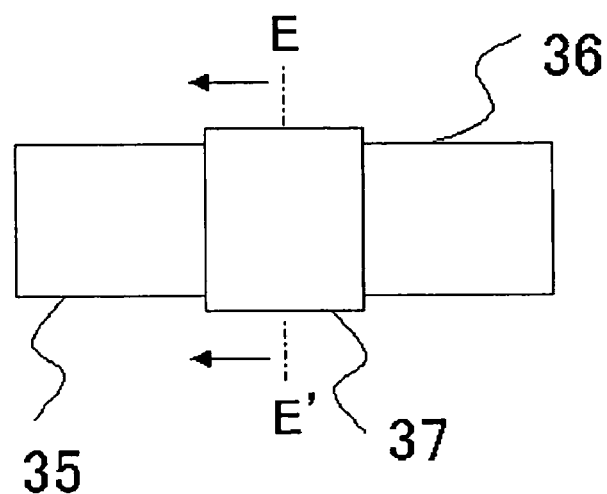
Figure 7C:
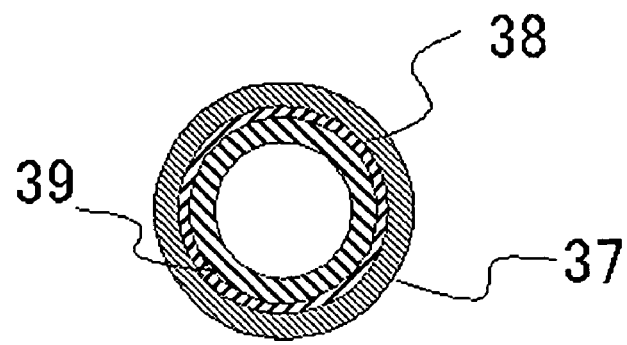
Figure 8A:
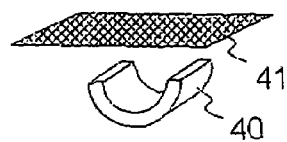
[FIG. 8]
Figure 8B:
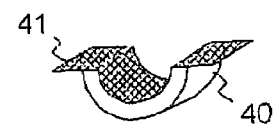
Figure 8C:
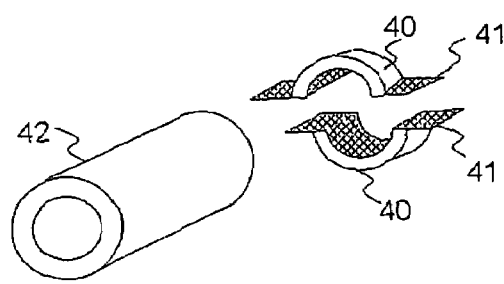
Figure 8D:
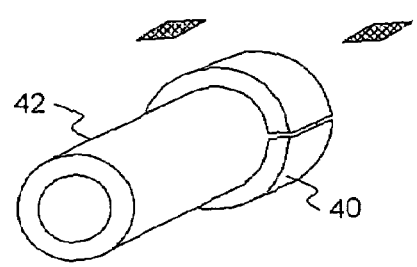
Figure 8E:
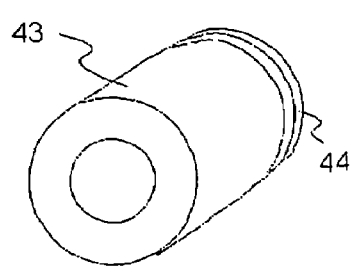
Figure 8F:
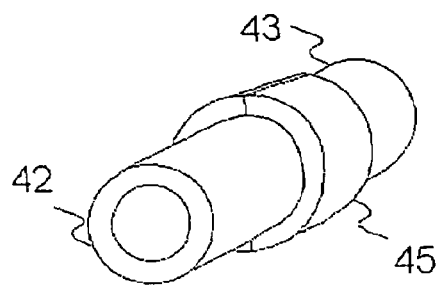
Figure 9A:
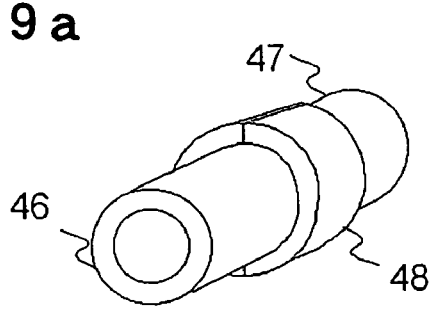
FIGS. 9a to 9d show an example of a method for producing a resin processed product provided with a sleeve. As an example, a resin member of polyethylene, fusion-bonded to a pipe of polyethylene resin, and a stopper on the outer surface of the iron pipe, are embraced by a sleeve to unify the polyethylene resin pipe and the iron pipe together.
Figure 9B:
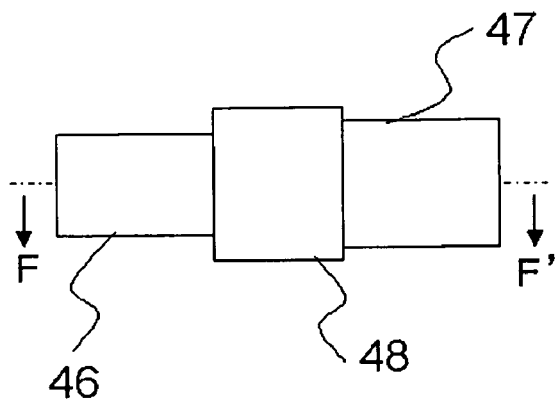
Figure 9C:
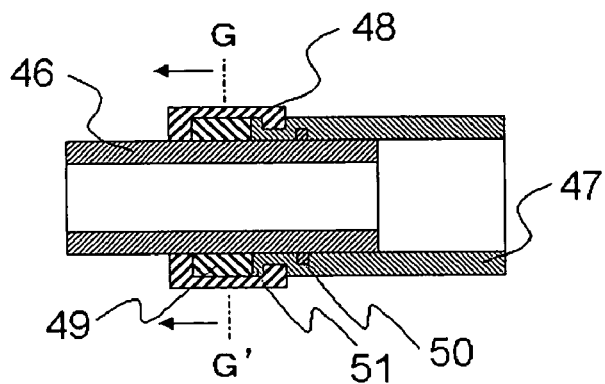
Figure 9D:
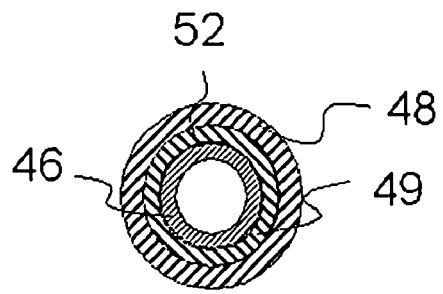

EXPLANATION OF NUMERALS 1. resin member 1 (joint)
2. resistance heating element (metal mesh)
3. resin member 2
4. resin member 3
5. current transmitting plug (electrode terminal)
6. redundant resistance heating element
7. resin member 1
8. resistance heating element (metal mesh)
9. resin member 2
10. current transmitting plug (electrode terminal)
11. resin member 1
12. resistance heating element (metal mesh)
13. resin member 2
14. current transmitting plug (electrode terminal)
15. insulator
16. resin member 1
17. resistance heating element (metal mesh)
18. resin member 2
19. resin member 3 (joint)
20. current transmitting plug (electrode terminal)
21. resin members abutted together (resin members 1 and 2)
22. resin member 1
23. resistance heating element (metal mesh)
24. resin member 2
25. resin member 3 (joint)
26. current transmitting plug (electrode terminal)
27. resin members abutted together (resin members 1 and 2)
28. insulator
29. resin member 1
30. resistance heating element (metal mesh)
31. resin member 2
32. resin member 3 (joint)
33. current transmitting plug (electrode terminal)
34. resin members abutted together (resin members 1 and 2)
35. resin member 1
36. resin member 2
37. resin member 3 (joint)
38. fusion-bonded layer
39. resin members bonded together (resin members 1 and 2)
40. resin member
41. resistance heating element
42. resin pipe
43. pipe to be unified to a resin pipe
44. stopper
45. sleeve
46. polyethylene resin pipe
47. iron pipe
48. sleeve
49. polyethylene resin member
50. O-ring
51. stopper
52. resistance heating element

EMBODIMENTS

The present invention is now explained with reference to specified embodiments which are not intended to limit the scope of the invention.

EXAMPLE 1

(Fusion-Bonding Resin Members Together)

For bonding polyethylene resin pipes with an outer diameter of 114 mm (φ114), an inner diameter φ103 and a wall thickness of 5.5 mm, a polyethylene resin ring mating therewith is cut into halves, to each of which a commercially available metal mesh (SUS304: 20 mesh) was mounted by heat fusion-bonding with a solder trowel. These two resin rings were mounted to preset locations (seam) of the polyethylene resin pipes to be unified together. A current transmitting plug (battery plug) was mounted for completely covering the ends of the metal mesh. A current of 15V was caused to flow through the metal mesh for 130 seconds to fusion-bond the resin rings to the polyethylene resin pipes. The melted polyethylene resin was noticed to be present in a gap on the portion of the junction surfaces of the polyethylene resin pipes and the polyethylene resin rings not press-contacted against the metal mesh.

EXAMPLE 2

(Fusion-Bonding of the Resin Members)

Resin rings were fusion-bonded to polyethylene resin pipes in the same way as in Example 1 except using polyethylene resin pipes with an outer diameter $\phi$140, an inner diameter of $\phi$127 and a wall thickness of 6.5 mm and a polyethylene resin ring mating therewith in place of the polyethylene resin pipes with an outer diameter of 114 mm ($\phi$114), an inner diameter $\phi$103 and a wall thickness of 5.5 mm.

EXAMPLE 3

(Evaluation of Resin Processed Product)

The resin processed products, obtained by the fusion-bonding process of Examples 1 and 2 (samples 1 and 2), were evaluated by a tensile test. This tensile test was conducted by converting the force in the tensile direction, using a compression tester TES-CB-10 manufactured by TOKYO KOKI SEISAKUSHO Co. Ltd. This test was carried out at a rate of tension of 10 mm/min as a jig was mounted to the resin ring.

TABLE 1

Evaluation by tensile test (unit: kN)

| | Tensile strength |
|---|---|
| Ex. 1 | 35.0 |
| Ex. 2 | 50.0 |

It was found by this test that, as for the inventive products (Examples 1 and 2), there were no unusual phenomena, such as exfoliation of resin rings, on the junction surfaces of the resin rings and the polyethylene resin pipes, and the tensile strength of the unified product was equivalent to the tensile strength innate to the polyethylene resin pipes. Hence, it may be seen that, with the inventive method, the resin processed product, superior in the mechanical strength (tensile strength), can be produced extremely readily.

EXAMPLE 4

(Jointing of Resin Pipe and Metal Pipe)

(1) A polyethylene resin ring with an outer diameter ($\phi$125), an inner diameter $\phi$114, a wall thickness of 5.5 mm and a width of 30 mm, was cut into halves, to each of which a commercially available metal mesh (SUS304: 20 mesh) with a length of 200 mm and a width of 20 mm was mounted by heat fusion-bonding with a solder trowel. These two resin rings were mounted to preset locations (ends) of the polyethylene resin pipes with an outer diameter of 114 mm ($\phi$114), an inner diameter of $\phi$103 and a wall thickness of 5.5 mm. A current transmitting plug (battery plug) was mounted for completely covering the ends of the metal mesh. A current of 12V was caused to flow through the metal mesh for 180 seconds to fusion-bonding the resin rings to the polyethylene resin pipes. The melted polyethylene resin was noticed to be present in a gap on the portion of the junction surfaces of the polyethylene resin pipes and the polyethylene resin rings not press-contacted against the metal mesh.

(2) For mounting an O-ring (P112 of JIS) to the inner surface of an iron (steel) pipe (SS400) with an outer diameter ($\phi$133), an inner diameter $\phi$114, and a wall thickness of 9.5 mm, a groove sized for mating with the O-ring was formed, and the O-ring was fitted therein. Moreover, another groove of the same length as that of the outer surface of the end portion of the iron pipe (3 mm in depth and 7 mm in width) was formed at a preset location on the outer surface and a stopper was formed to a width of 3 mm and a height from the bottom surface of the groove of 3 mm.

(3) The polyethylene resin pipe, produced in (1), was held as it was abutted against the O-ring on the inner surface of the end portion of the metal pipe obtained in (2).

(4) The resin member, fusion-bonded to the polyethylene resin, and the stopper on the outer surface of the iron pipe, were embraced by a sleeve of a corresponding size and shape. The sleeve was split into two at the outset into two sleeves, the inner surfaces of which were formed with inner projections which were abutted against the stopper to stop the axial sliding of the sleeve of the resin member against the counterpart side pipe so that the inner projection was engaged with the stopper-formed on the inner surface of the sleeve whereby the resin member was axially constrained in the sleeve to cause the pipe being jointed (typically being inserted) to be held in the sleeve against relative axial movement. The two split sleeves were then jointed together by welding.

EXAMPLE 5

(Evaluation of Resin Processed Product by Hydraulic Test)

The resin processed product (sample 3), obtained on jointure in Example 4, was evaluated by a hydraulic test. The test was conducted twice.

(Test Method)

(1) A hydraulic pressure of 2 kgf was applied to the inside of a tube of a resin processed product (inventive product) obtained in Example 4 and was maintained for one minute. The state of the resin processed product at this time was checked.

(2) The hydraulic pressure within the tube of the inventive product was raised at an interval of 2 kgf and the state was maintained for one minute for each increment of the hydraulic pressure. The state of the resin processed product at this time was checked.

(Test Result)

It was found that, at the pressure not larger than the hydraulic pressure shown in Table 2, there were noticed no unusual phenomena, such as water leakage, at the joint portions of the polyethylene resin-iron pipe, while no expansion was observed on the outer circumference of the polyethylene resin pipe.

TABLE 2

Evaluation by Hydraulic pressure Test (unit: kgf)

| | Hydraulic pressure | | |
| --- | --- | --- | --- |
| | First | Second | Average |
| Ex. 4 | 16 | 20 | 18 |

EXAMPLE 6

(Evaluation of the Resin Processed Product by Tensile Test)

The resin processed product (sample 3), obtained on jointure by the Example 4, was evaluated by the tensile test by the following method. Meanwhile, the present test was conducted twice.

(Test Method)
1. A fixed jig was mounted to a polyethylene resin pipe side of the resin processed product, jointed in Example 4 (inventive product) and was set on a tensile tester (the tensile tester similar to that used in Example 3). A measurement tool was mounted between the resin processed product and the test device.
2. A fixed jig was mounted and secured to the iron pipe side.
3. A tensile force of 0.5 kN was applied on the test device and kept for one minute to confirm the state of the resin processed product at this time.
4. The tensile force was then raised at a step of 0.5 kN and the state was kept for one minute in the same manner as above to check the state of the resin processed product.

(Test Result)

In the present inventive product, no unusual phenomena were observed in the jointure of the polyethylene resin-iron junction pipe for the values of the tensile strength shown in the following Table 3. It was also confirmed that the tensile strength of the inventive product was superior to that of the conventional polyethylene-iron junction pipe.

TABLE 3

Evaluation by tensile test (unit is kN)

| | Hydraulic pressure | | |
| --- | --- | --- | --- |
| | First | Second | Average |
| Ex. 4 | 35 | 35 | 35 |
| Conventional Product | — | — | 23 |

EXAMPLE 7

(Evaluation of the Resin Processed Product by Destructive Test)

Of the resin processed product (sample 3), obtained in Example 4, evaluation by a destructive test was conducted by the following method:

(Test Method)
1. A fixed jig was mounted to the resin processed product (inventive product) jointed by Example 4 and the resulting assembly was set on a destructive test device (tensile test device similar to that used in Example 3).
2. A fixed jig was mounted and secured to the iron (steel) pipe side.
3. The tensile force was applied by the tensile tester and was gradually raised. The state of the resin processed product at this time was confirmed.

(Test Result)

Although the polyethylene resin pipes were distorted severely, there were observed no unusual phenomena in the junction area of the polyethylene resin-iron junction pipe. It was confirmed that the destruction strength at the junction area of the polyethylene resin-iron junction pipe amounted to 35 kN or higher.

It may be seen from the above result that, in the inventive product (example 4), there occurs no unusual phenomenon in the jointure between the polyethylene resin pipe and the iron pipe, such as exfoliation (peeling off) of the resin ring, such that the present product is superior in resistance against hydraulic pressure, tensile strength and destructive strength to the conventional polyethylene resin-iron junction pipe. Consequently, with the present method, the resin processed product, superior in the mechanical strength, may be produced extremely readily.

(Meritorious Effect of the Invention)

According to the present invention, the resin members may readily be fusion-bonded and unified together by conducting electric current, for heating, through the meshed or wired metal wire (resistance heating element), as described above, so that there is no risk of generation of carbon or of shorting during current passage through the enclosed resistance heating element, thus enabling the adverse effect due to the environmental temperature to be minimized to fuse and unify the resin members extremely readily. Moreover, since the shape of the metal wire can be selected freely, while the metal wire can be worked freely, there is no limitation imposed on the shape of the resin member. Hence, a resin processed product may be produced by jointing resin members, or by conduction heating the current through the resin members by fusion-bonding and unifying the resin members together.

The resin members may be fusion-bonded and unified together (jointed) extremely readily, with the least adverse effect due to environmental temperature, such that it is possible to provide a resin processed product having superior mechanical strength, such as tensile strength.

Moreover, by joining two pipes, at least one of which is formed of resin, and in particular, by joining a resin pipe and a metal pipe, at the respective jointures, to a high mechanical strength, it is possible to produce a resin processed product extremely readily.

Thus, the present invention is highly useful for industrial usage.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for fusion-bonding a first cylindrical resin member and a second ring shaped or cylindrical resin member together through electric current-conduction-heating for jointing the members together, comprising:
   a. means for interposing a meshed or mesh-patterned metal wire as a resistance heating element in a junction site between the first cylindrical resin member and the second ring shaped or cylindrical resin member so that the resistance heating element contacts joint surfaces of at least circular circumferential surfaces of said junction site, and abutting the resin members together to maintain the abutted state of the members; and b. means for conducting electric current through said meshed or mesh-patterned metal wire to heat the metal wire to a temperature sufficient for both the resin members to fusedly fill mesh openings of said wire in gaps formed on the surfaces not in press-contact with said resistance heating element in said joint surfaces, wherein a third ring shaped resin member having a divided form into 2 or more sections is disposed on the junction site, and wherein said resistance heating element is interposed on a corresponding joint surface of the divided section.

2. A resin processed product comprising a resin processed component having a fusion-bonded layer, said fusion-bonded layer being interposed in an abutted junction area between a resin pipe and a resin component, formed by conducting electric current through a resistance heating element of metal wire having meshed or mesh-patterned openings, said fusion-bonded layer being formed through said openings between said resin pipe and said resin component, a pipe to be connected to said resin pipe, said pipe to be connected having a stopper on an outer surface of an end thereof;

an O-ring disposed for contacting the outer surface of an end portion of the resin pipe and the inner surface of an end portion of said pipe to be connected; and a sleeve for embracing the stopper on the outer surface of the end portion of the pipe to be connected.

3. The resin processed product as defined in claim 2 wherein said pipe to be connected is a metal pipe.

4. An apparatus for fusion-bonding resin members together though electric current-conduction-heating for jointing the members together, comprising:

means for interposing a resistance heating element between an abutted portion and a ring-shaped resin member, wherein the abutted portion is formed by abutting a first end of a first cylindrical resin member to a second end of a second cylindrical resin member, wherein the ring-shaped resin member is disposed on the abutted portion of external surfaces of the first end and the second end, wherein the resistance heating element is interposed between the abutted portion and the ring-shaped resin member, wherein the resistance heating element is made of a metal wire having meshed openings or mesh-patterned openings; and means for applying electric current to the resistance heating element to fusion-bond the first and second cylindrical resin members with the ring-shaped resin member, to a temperature sufficient for both the first and second resin members to fusedly fill said mesh openings or mesh-patterned openings for fusion-bonding together in gaps formed on the surfaces not in press-contact with said resistance heating element in joint surfaces.

5. A method for producing a resin processed product by fusion-bonding and jointing a first cylindrical resin member and a second ring shaped or cylindrical resin member together by electric current conduction-heating, comprising a. a step of abutting both said resin members together with interposition of a resistance heating element of metal wire, having meshed openings or mesh-patterned openings, in a junction site between the first cylindrical resin member and the second ring shaped or cylindrical resin member so that the resistance heating element contacts joint surfaces of at least circular circumferential surfaces of said junction site; and b. a step of conducting electric current through said resistance heating element for heating to fusion-bond said resin members together to a temperature sufficient for both the resin members to fusedly fill said openings for fusion-bonding together in gaps formed on the surfaces not in press-contact with said resistance heating element in said joint surfaces, wherein a third ring shaped resin member having a divided form into 2 or more sections is disposed on the junction site, and wherein said resistance heating element is interposed on a corresponding joint surface of the divided section.

6. The method for producing the resin processed product as defined in claim 5, wherein said resistance heating element is interposed also in the division surfaces of the divided sections of said third ring shaped resin member, heated by current conduction to fusion-bond also the divided sections of the third resin member each other.

7. The method for producing the resin processed product as defined in claim 5 wherein said third resin member having a ring- or cylindrical shape has a slit through which said resistance heating element is interposed throughout said joint surface.

8. A method for producing a resin processed product by jointing pipes at least one of which is formed of resin, said method comprising:

a. a step of holding a resin component in a state of being abutted against an outer surface of one resin pipe at an end portion thereof, with a resistance heating element of metal wire, having meshed or mesh-patterned openings, being interposed at an abutted junction between said one resin pipe and said resin component;

b. a step of conducting electric current through said resistance heating element for generating heat for fusion-bonding said one resin pipe and said resin component together through said openings;

c. a step of providing a stopper on an outer surface of an end portion of a pipe to be jointed to said one resin pipe and providing an O-ring on an inner surface of the pipe to be jointed at an end portion thereof;

d. a step of holding said one resin pipe and said pipe to be jointed in a state in which said one resin pipe is abutted against said pipe to be jointed, so that said O-ring disposed on the inner surface of the end portion of the pipe to be jointed contacts an outer surface of said one resin pipe; and e. a step of embracing, by a sleeve, said resin component, fusion-bonded to said one resin pipe, and said stopper on the outer surface of the end portion of said pipe to be jointed.

9. The method for producing a resin processed product as defined in claim 8 wherein said pipe to be jointed to said one resin pipe is a metal pipe.

10. A method for producing a resin processed product by fusion-bonding and jointing resin members together by electric current conduction-heating, comprising abutting a first end of a first cylindrical resin member to a second end of a second cylindrical resin member, while disposing a ring-shaped resin member on an abutted portion of external surfaces of the first end and the second end, wherein a resistance heating element is interposed between the abutted portion and the ring-shaped resin member, wherein the resistance heating element is made of a metal wire having meshed openings or mesh-patterned openings; and applying electric current to the resistance heating element to fusion-bond the first and second cylindrical resin members with the ring-shaped resin member, to a temperature sufficient for both the first and second resin members to fusedly fill said mesh openings or mesh-patterned openings for fusion-bonding together in gaps formed on the surfaces not in press-contact with said resistance heating element in joint surfaces.

* * * * *